O. BROCKMAN.
BRIDLE BLIND.
APPLICATION FILED APR. 11, 1914.
1,134,816.
Patented Apr. 6, 1915.
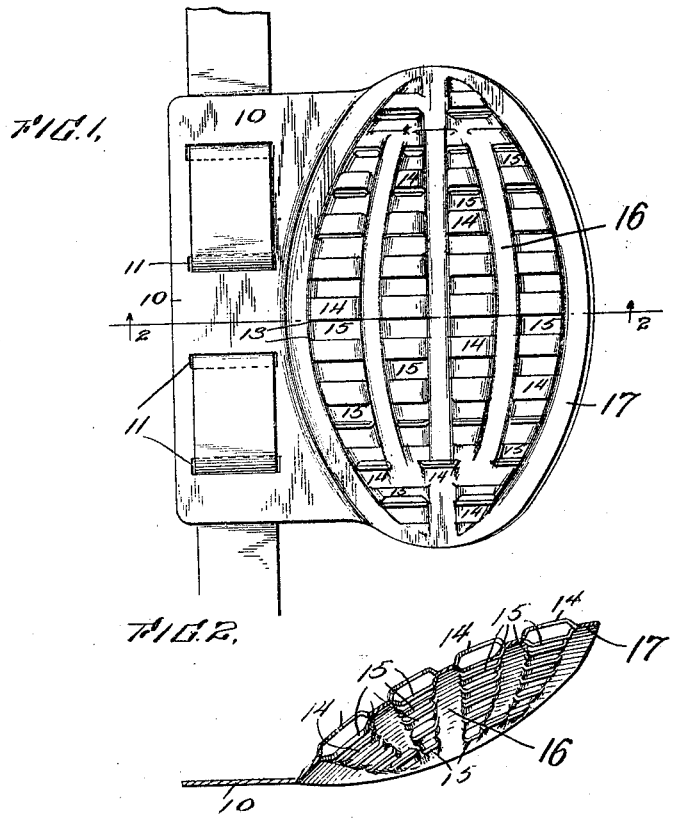
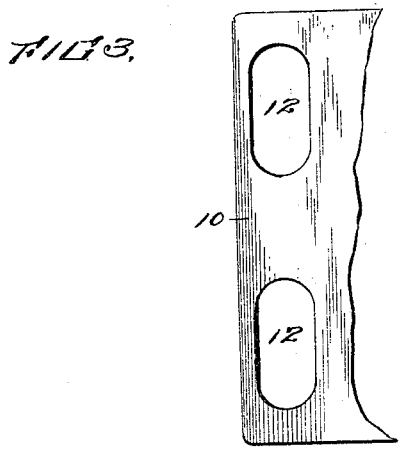
Witnesses
R. S. Trogner
L. L. Morrell
Inventor
Oscar Brockman.
By Mason Fenwick Lawrence,
Attorneys

UNITED STATES PATENT OFFICE.

OSCAR BROCKMAN, OF LOUISVILLE, KENTUCKY.

BRIDLE-BLIND.

1,134,816.     Specification of Letters Patent.     Patented Apr. 6, 1915.

Application filed April 11, 1914.   Serial No. 831,203.

*To all whom it may concern:*

Be it known that I, OSCAR BROCKMAN, a citizen of the United States, residing at Louisville, in the county of Jefferson and State of Kentucky, have invented certain new and useful Improvements in Bridle-Blinds; and I do hereby declare the following to be a full, clear, and exact description of the invention, such as will enable others skilled in the art to which it appertains to make and use the same.

This invention relates to bridle blinds, and has for an object to provide improved means for ventilating or permitting the passage of air through the blind while obscuring the vision of the animal to which the blind is applied.

To this end the invention consists in a blind made of sheet material having interrupted slits or perforations formed therein, with parts of the material offset in different planes permitting the passage of air through the slits so formed, all as will be hereinafter more fully described and claimed.

In the drawings: Figure 1 is a view of the improved blind in side elevation. Fig. 2 is a sectional view of the improved blind taken on line 2—2 of Fig. 1. Fig. 3 is a sectional view showing means for attaching the blind to a rope bridle.

Like characters of reference designate corresponding parts throughout the several views.

The improved blind which forms the subject matter of this application comprises a substantially plain portion 10 having openings to receive the head stall of the bridle, those at Fig. 1 being indicated at 11 as slots to pass a strap therethrough while those at Fig. 3 indicated as 12 are of proper shape to permit the passage of a rope therethrough.

Irrespective of the shape of the openings, the blind proper is composed of a sheet of material properly shaped as desired, one form being shown at Fig. 2 corresponding to the usual shape of such bridle blinds. The sheet of material is provided with slits 13 which as shown in the drawing are projected in parallelism with the slots 11, *i. e.* horizontally across the blind; and these slits are interrupted to leave upright plain or unslitted paths 16 and a margin or frame 17, so that the slits do not unduly weaken the paths and between the slits 13 is stamped so that alternate bars are bent respectively upwardly and downwardly as shown particularly at 14 and 15. It is also to be understood that the particular manner of bending the intermediate parts is immaterial to the present invention, so that the slits 13 are opened to permit the passage of air to ventilate the blind and at the same time prevent the vision of the animal wearing the blind so that the blind performs its allotted function.

I claim:

1. A bridle blind formed from a sheet of material provided with horizontal slits interrupted to leave upright unslitted paths and an unslitted margin, the bars between said slits being deflected alternately inward and outward.

2. A bridle blind formed from a sheet of material having a plain portion provided with means for attachment to the head stall, and a blind portion proper provided with horizontal slits interrupted to leave upright unslitted paths, the bars between said slits being deflected alternately inward and outward.

In testimony whereof I affix my signature in presence of two witnesses.

OSCAR BROCKMAN.

Witnesses:
EMMA G. SCHOENLAUB,
THOMAS J. TUCKER.

Copies of this patent may be obtained for five cents each, by addressing the "Commissioner of Patents, Washington, D. C."